United States Patent
Urano et al.

(10) Patent No.: US 10,437,257 B2
(45) Date of Patent: Oct. 8, 2019

(54) AUTONOMOUS DRIVING SYSTEM

(71) Applicant: TOYOTA JIDOSHA KABUSHIKI KAISHA, Toyota-shi, Aichi-ken (JP)

(72) Inventors: Hiromitsu Urano, Numazu (JP); Koji Taguchi, Isehara (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 263 days.

(21) Appl. No.: 15/337,396

(22) Filed: Oct. 28, 2016

(65) Prior Publication Data

US 2017/0123434 A1    May 4, 2017

(30) Foreign Application Priority Data

Nov. 4, 2015 (JP) .................................. 2015-216969

(51) Int. Cl.

| | |
|---|---|
| *G05D 1/02* | (2006.01) |
| *B60Q 9/00* | (2006.01) |
| *G01C 21/34* | (2006.01) |
| *G01S 19/42* | (2010.01) |
| *G05D 1/00* | (2006.01) |
| *G08G 1/16* | (2006.01) |
| *B60W 40/10* | (2012.01) |
| *G08G 1/0962* | (2006.01) |

(Continued)

(52) U.S. Cl.
CPC ........... *G05D 1/0278* (2013.01); *B60Q 9/008* (2013.01); *B60W 40/10* (2013.01); *G01C 21/34* (2013.01); *G01C 21/3407* (2013.01); *G01S 19/42* (2013.01); *G05D 1/0088* (2013.01); *G06F 3/016* (2013.01); *G08G 1/09626* (2013.01); *G08G 1/09675* (2013.01); *G08G 1/096716* (2013.01); *G08G 1/096791* (2013.01); *G08G 1/162* (2013.01); *G08G 1/167* (2013.01); *G05D 1/0061* (2013.01); *G05D 1/0248* (2013.01); *G05D 1/0257* (2013.01); *G05D 2201/0213* (2013.01); *G06K 9/00791* (2013.01)

(58) Field of Classification Search
None
See application file for complete search history.

(56) References Cited

U.S. PATENT DOCUMENTS

| | | |
|---|---|---|
| 9,141,109 B1 | 9/2015 | Kamata |
| 2009/0326713 A1 | 12/2009 | Moriya |

(Continued)

FOREIGN PATENT DOCUMENTS

| | | |
|---|---|---|
| JP | 10-76964 A | 3/1998 |
| JP | 11-102157 A | 4/1999 |

(Continued)

*Primary Examiner* — David P. Merlino
(74) *Attorney, Agent, or Firm* — Sughrue Mion, PLLC

(57) ABSTRACT

A vehicle includes an autonomous driving system that can determine whether an interruption of autonomous driving control is required. The autonomous driving system can determine that interruption is required based on an evaluation value dependent upon a target position and a control position, and an evaluation value threshold. The vehicle further includes communication systems that provide interruption information on the autonomous driving control to an occupant of the vehicle and to other vehicles around the vehicle if it is determined that the interruption of the autonomous driving control is required.

22 Claims, 6 Drawing Sheets

(51) Int. Cl.
    *G08G 1/0967*     (2006.01)
    *G06F 3/01*     (2006.01)
    *G06K 9/00*     (2006.01)

(56) References Cited

U.S. PATENT DOCUMENTS

| | | |
|---|---|---|
| 2012/0089273 A1 | 4/2012 | Seder et al. |
| 2012/0197497 A1 | 8/2012 | Kato |
| 2013/0110343 A1 | 5/2013 | Ichikawa et al. |
| 2013/0231823 A1* | 9/2013 | Wang .................. B62D 1/00 701/24 |
| 2015/0153733 A1* | 6/2015 | Ohmura ............. B60W 30/165 701/23 |
| 2016/0146618 A1* | 5/2016 | Caveney ............... B60W 30/00 701/25 |
| 2016/0210850 A1* | 7/2016 | Urano .................. G05D 1/0088 |
| 2016/0280236 A1* | 9/2016 | Otsuka ............ B60W 30/18154 |
| 2017/0329328 A1* | 11/2017 | Horita .................. B60W 50/14 |
| 2018/0222491 A1* | 8/2018 | Miyahara ............. B60W 50/14 |

FOREIGN PATENT DOCUMENTS

| | | |
|---|---|---|
| JP | 2001-199295 A | 7/2001 |
| JP | 2003-205805 A | 7/2003 |
| JP | 2009-051356 A | 3/2009 |
| JP | 2009-291540 A | 12/2009 |
| JP | 2011-162132 A | 8/2011 |
| JP | 2012-051441 A | 3/2012 |
| JP | 5382218 B2 | 10/2013 |
| WO | 2011/048688 A1 | 4/2011 |
| WO | 2011/158347 A1 | 12/2011 |

\* cited by examiner

AUTONOMOUS DRIVING SYSTEM

INCORPORATION BY REFERENCE

The disclosure of Japanese Patent Application No. 2015-216969 filed on Nov. 4, 2015 including the specification, drawings and abstract is incorporated herein by reference in its entirety.

BACKGROUND

1. Technical Field

The present disclosure relates to an autonomous driving system that performs autonomous driving control of a vehicle.

2. Description of Related Art

As a driving assistance device that performs driving assistance control for assisting a driver in driving a vehicle, a device is known that provides the information to the driver to indicate, in advance, that the driving assistance control will be interrupted when the reliability of driving assistance control is expected to decrease due to a road environment in which it becomes difficult to recognize white lines in a place such as a tunnel (Japanese Patent Application Publication No. 2003-205805 (JP 2003-205805 A)).

Development of autonomous driving control is underway to allow a vehicle to travel without the driver performing the driving operation. When performing autonomous driving control, a travel plan that causes the vehicle to travel toward the destination is generated from the map information.

SUMMARY

Unlike the driving assistance device described above, it is sometimes desirable that autonomous driving control be interrupted if the road environment is such that white lines can be recognized but the map information and the road environment differ to such an extent that this difference affects the autonomous driving control. In such a case, before interrupting autonomous driving control, it is preferable to provide information about the interruption of autonomous driving control to the occupants of a vehicle and to the other vehicles around the vehicle.

An autonomous driving system of the present disclosure provides interruption information on autonomous driving control to the occupants of a vehicle and to the other vehicles around the vehicle if the interruption of autonomous driving control is required based on the map information.

An autonomous driving system in an aspect of the present disclosure is an autonomous driving system that performs autonomous driving control of a vehicle. The autonomous driving system includes a map database that stores map information and an electronic control unit. The electronic control unit includes a travel plan generation unit configured to generate a travel plan of the vehicle based on a target route of the vehicle and the map information, the travel plan including a control target value of the vehicle corresponding to a position on the target route, the target route being set in advance, a vehicle position recognition unit configured to recognize a position of the vehicle based on a measurement result of a position measurement unit of the vehicle, a road environment recognition unit configured to recognize a road environment around the vehicle based on a detection result of an external sensor of the vehicle, a traveling state recognition unit configured to recognize a traveling state of the vehicle based on a detection result of an internal sensor of the vehicle, a traveling control unit configured to perform the autonomous driving control of the vehicle based on the travel plan, the position of the vehicle, the road environment around the vehicle, and the traveling state of the vehicle, a detection value acquisition unit configured to acquire a control-result detection value, which is detected during the autonomous driving control of the vehicle, in association with the position on the target route, an evaluation value calculation unit configured to calculate an evaluation value of the travel plan based on a result of comparison between the control target value and the control-result detection value, an interruption requirement determination unit configured to determine whether an interruption of the autonomous driving control is required based on the evaluation value of the travel plan and an evaluation threshold, and an information providing unit configured to provide interruption information on the autonomous driving control to an occupant of the vehicle and to other vehicles around the vehicle if the interruption requirement determination unit determines that the interruption of the autonomous driving control is required.

In the autonomous driving system in the aspect described above, if there is a difference between the map information and the actual road environment, a difference is generated between a control target value in the travel plan that depends on the map information and the corresponding control-result detection value detected during autonomous driving control according to the actual road environment. Therefore, the autonomous driving system can determine whether the interruption of autonomous driving control is required based on the evaluation value of the travel plan calculated from the result of comparison between the control target values and the control-result detection values. If it is determined that the interruption of the autonomous driving control is required, this autonomous driving system provides the interruption information on the autonomous driving control to the occupants of the vehicle and to the other vehicles around the vehicle. Therefore, this autonomous driving system can provide the interruption information on the autonomous driving control, generated due to the difference between the map information and the road environment, to the occupants of the vehicle and to the other vehicles around the vehicle.

In the aspect described above, the interruption requirement determination unit may set the evaluation threshold based on a position of the vehicle on a map corresponding to a calculation time of the evaluation value of the travel plan or based on a calculation time-of-day of the evaluation value of the travel plan. Because higher map information accuracy is required for autonomous driving control in an urban area than in a suburb, this autonomous driving system can set an evaluation threshold, based on the position of the vehicle on the map corresponding to the calculation time of the evaluation value of the travel plan, to accurately determine whether to interrupt the autonomous driving control according to the position of the vehicle on the map. Alternatively, because accuracy in recognizing an object, such as a white line, in a camera-captured image in the night is decreased as compared to that in the day with the result that this decrease in accuracy affects the reliability in determining whether the interruption of the autonomous driving control is required, this autonomous driving system can set the evaluation threshold based on the calculation time-of-day of the evaluation value of the travel plan, thus making it possible to determine correctly whether the interruption of the autonomous driving control is required according to the calculation time-of-day.

The autonomous driving system in the aspect described above can provide the interruption information on autonomous driving control to the occupants of a vehicle and to the other vehicles around the vehicle if the interruption of autonomous driving control is required due to an error in the map information.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Preferred embodiments of the present disclosure are described in detail below with reference to the drawings.

Figure 1:
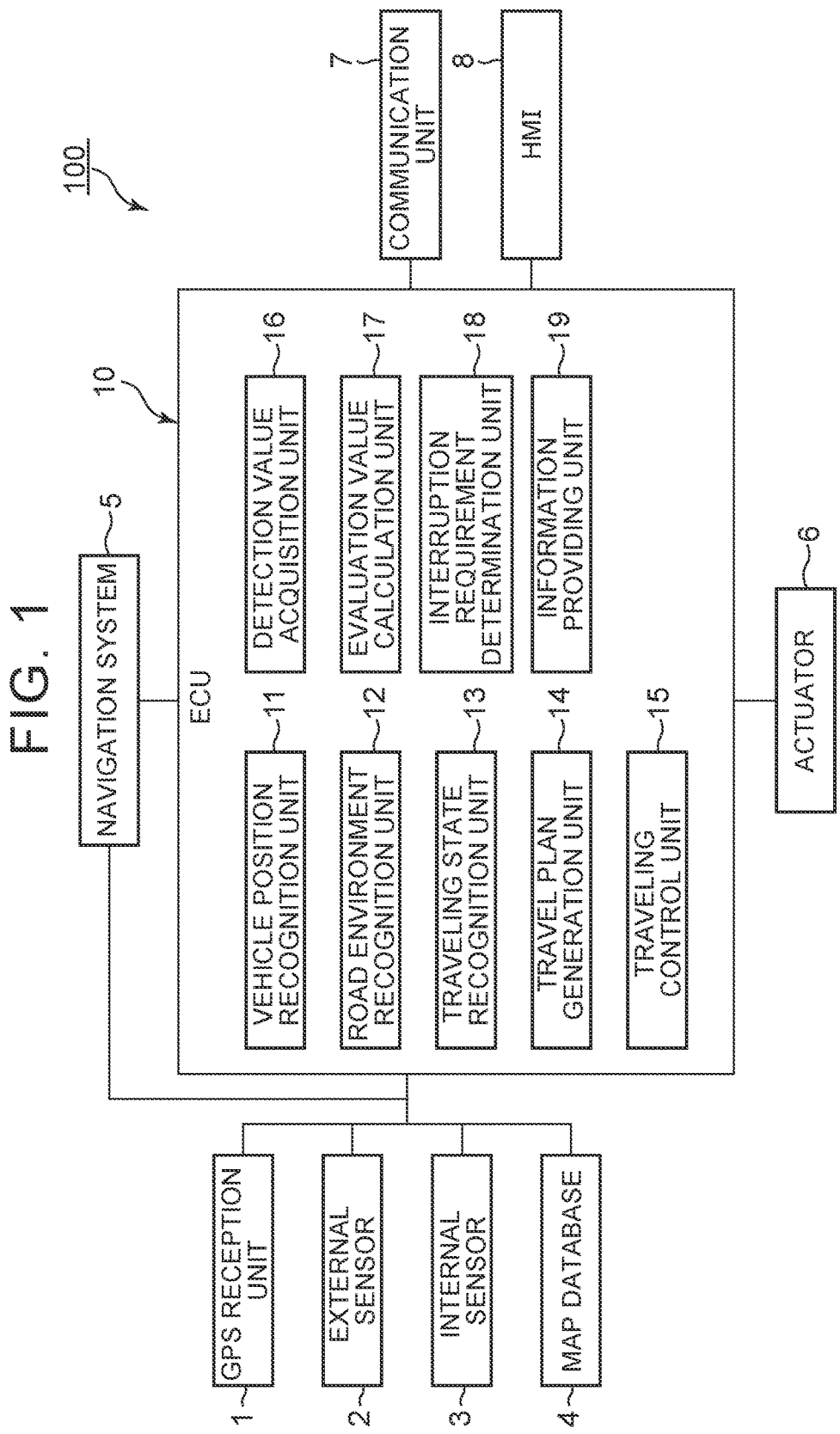
FIG. 1 is a block diagram showing an autonomous driving system in this embodiment.

FIG. 1 is a block diagram showing an autonomous driving system 100 in this embodiment. The outline of the autonomous driving system 100 is described first, followed by the description of the configuration of the autonomous driving system 100. After that, various types of processing performed by the autonomous driving system 100 are described.

The autonomous driving system 100, mounted on a vehicle such as a passenger car, is a system for performing the autonomous driving control of a vehicle. When the driver performs an operation to start autonomous driving control (for example, the autonomous driving control start button is pressed), the autonomous driving system 100 starts the autonomous driving control of the vehicle.

Autonomous driving control refers to vehicle control that causes a vehicle to travel autonomously along a target route that is set in advance. Under autonomous driving control, the vehicle travels autonomously without driver's driving operation. A target route refers to a route on the map along which the vehicle will travel under autonomous driving control.

Figure 2:
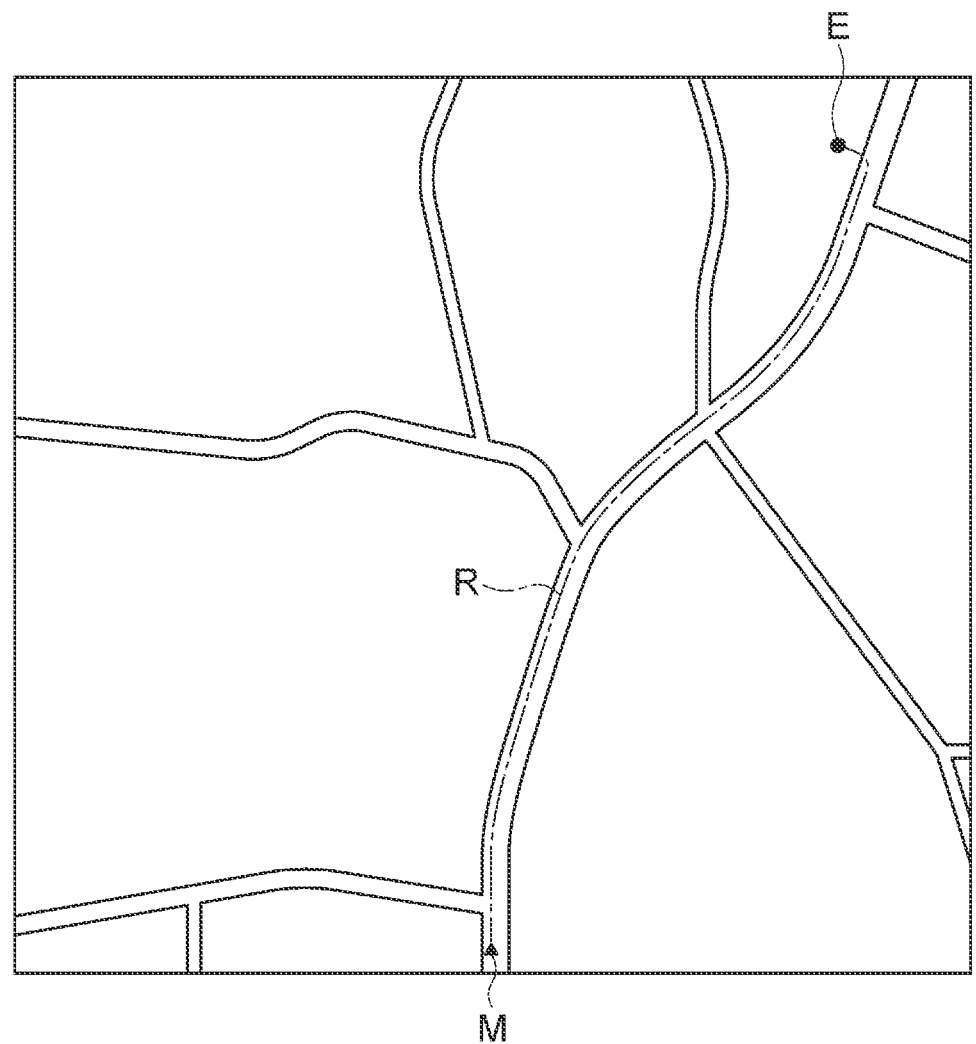
FIG. 2 is a diagram showing a target route.

FIG. 2 is a diagram showing a target route. FIG. 2 shows a vehicle M, a target route R of the vehicle M, and a destination E of the target route R. The destination E is a destination that is set by the driver. The autonomous driving system 100 uses a known method to set the target route R, from the current position of the vehicle M to the destination E, based on the map information. The autonomous driving system 100 sets the shortest route, from the current position of the vehicle M to the destination E, as the target route R.

The autonomous driving system 100 uses the map information to perform autonomous driving control. The map information includes the position information on roads (position information on each lane), information on road shapes (for example, road shapes such as a curve a straight part, curve curvature), the information on road widths (information on lane width), and the information on speed limits on the roads. In addition, the map information includes the position information on intersections and branches, the position information on stop lines, the position information on crosswalks, and the position information on traffic lights. The map information may also include the road slope information and the road cant information.

In addition, the map information may include the position information and the shape information on non-moving obstacles such as curbs, utility poles, poles, guardrails, walls, and buildings. The map information may include the position information and the shape information on road surface paintings, such as letters and marks, painted on the road surface. The road surface paintings may include manholes. The map information may include the information on name boards provided above a road and the information on signs provided on the roadsides.

The autonomous driving system 100 generates a travel plan, which will be used for autonomous driving control, based on the target route R and the map information. A travel plan is a plan that causes the vehicle M to travel along the target route R from the current position of the vehicle M to the destination that is, for example, ten-odd kilometers ahead. The travel plan is generated based on the map information.

A travel plan includes control target values of the vehicle M each of which corresponds to a position of the vehicle M on the target route R. A position on the target route R refers to a position on the target route R on the map in the extending direction. A position on the target route R means a set longitudinal position that is set at a predetermined interval (for example, 1 m) in the extending direction of the target route.

A control target value refers to a value used in the travel plan as a control target of the vehicle M. The control target value is set in association with each set longitudinal position on the target route R. The control target value includes a target lateral position of the vehicle M and a target vehicle speed of the vehicle M.

The target lateral position refers to the lateral position of the vehicle M that is used as a control target in the travel plan. The lateral position of the vehicle M refers to the position of the vehicle M in the road width direction (lane width direction) of the road on which the vehicle M travels. The lane width direction refers to the direction that, on the road surface of the road, intersects at right angles to the white lines that form a lane of the road. In addition, the position of the vehicle M in the extending direction of the road (direction that intersects at right angles to the road width direction) is the longitudinal position of the vehicle M. The longitudinal position of the vehicle M is the position of the vehicle M on the target route R in the extending direction. The target vehicle speed refers to the vehicle speed of the vehicle that is used as a control target in the travel plan.

The autonomous driving system 100 recognizes the road environment around the vehicle M based on the images captured by the on-vehicle camera, detection result of the on-vehicle LIDAR, or detection result of the on-vehicle radar. The road environment includes the positions of white lines that form a traveling lane in which the vehicle M travels, line type of white lines, road shapes (including road curvature), lane width, and positions of non-moving obstacles. The non-moving obstacles include buildings, walls, guardrails, and utility poles. The road environment may include the traveling lane cant and the traveling lane slope.

In addition, the autonomous driving system 100 recognizes the traveling state of the vehicle M based on the detection result of the devices such as the vehicle speed sensor of the vehicle M. The traveling state includes the vehicle speed of the vehicle M, acceleration of the vehicle M, and yaw rate of the vehicle M. The autonomous driving system 100 measures the position of the vehicle M based on the measurement result of the Global Positioning System (GPS) reception unit that will be described later. The autonomous driving system 100 may use the position information on the non-moving obstacles included in the map information and the detection result of the devices such as the on-vehicle radar to measure the position of the vehicle M based on the Simultaneous Localization and Mapping (SLAM) technology.

The autonomous driving system 100 performs autonomous driving control based on the road environment around the vehicle M, the traveling state of the vehicle M, the position of the vehicle M, and the travel plan. When the map information includes no error and corresponds to the actual road environment, the autonomous driving system 100 performs autonomous driving control of the vehicle M according to the travel plan. The autonomous driving control of the vehicle M according to the travel plan refers to autonomous driving control for controlling the vehicle M so that the actual lateral position of the vehicle M and the actual vehicle speed of the vehicle M at a set longitudinal position on the target route R are in agreement with the target lateral position and the target vehicle speed at the set longitudinal position.

When the map information includes an error and, as a result, there is a difference between the map information and the actual road environment, the autonomous driving system 100 performs autonomous driving control corresponding to the actual road environment. When a generated travel plan indicates that the vehicle M travels at a fixed speed but the stop line is detected ahead of the vehicle in the image captured by the on-vehicle camera, the autonomous driving system 100 performs autonomous driving control that causes the vehicle M to stop temporarily with priority, not on the travel plan, but on the actual road environment. When a generated travel plan indicates that the vehicle M travels at a fixed speed but there is a vehicle traveling ahead of the vehicle M at a speed lower than the fixed speed, the autonomous driving system 100 performs autonomous driving control that causes the vehicle M to follow the preceding vehicle with priority, not on the travel plan, but on the actual road environment.

Next, after the autonomous driving control of the vehicle M along the target route R is started, the autonomous driving system 100 acquires the control-result detection values of the vehicle M detected during the autonomous driving control. The autonomous driving system 100 acquires the control-result detection values each associated with a set longitudinal position on the target route R. Each control-result detection value is a detection value indicating the result of how the vehicle M is controlled by the autonomous driving control. The control-result detection values are acquired each associated with a set longitudinal position on the target route R.

A control-result detection value includes the control-result lateral position of the vehicle M and the control-result vehicle speed of the vehicle M. The control-result lateral position is the lateral position of the vehicle M generated as a control result of the autonomous driving control. The control-result lateral position is the lateral position of the vehicle M during the autonomous driving control detected at a set longitudinal position. The detection of the lateral position of the vehicle M will be described in detail later. The control-result vehicle speed is the vehicle speed of the vehicle M generated as a control result of the autonomous driving control. The control-result vehicle speed is the vehicle speed of the vehicle M during the autonomous driving control detected at a set longitudinal position. The control-result vehicle speed is detected by the on-vehicle vehicle speed sensor.

The autonomous driving system 100 calculates the evaluation value of a travel plan based on the result of comparison between the control target values in the travel plan and the control-result detection values detected during the autonomous driving control. For each set longitudinal position on the target route R, the autonomous driving system 100 compares the control target value in the travel plan with the control-result detection value detected during the autonomous driving control. The evaluation value of the travel plan indicates the degree of equality between the control target values in the travel plan and the control-result detection values detected during the autonomous driving control or the degree of difference between the control target values in the travel plan and the control-result detection values detected during the autonomous driving control. The evaluation value of the travel plan is calculated in such a way that the more equal the control target values in the travel plan and the control-result detection values detected during the autonomous driving control are, the larger is the evaluation value of the travel plan is or that the larger the difference between the control target values in the travel plan and the control-result detection values detected during the autonomous driving control is, the smaller is the travel plan evaluation value.

Figure 3:
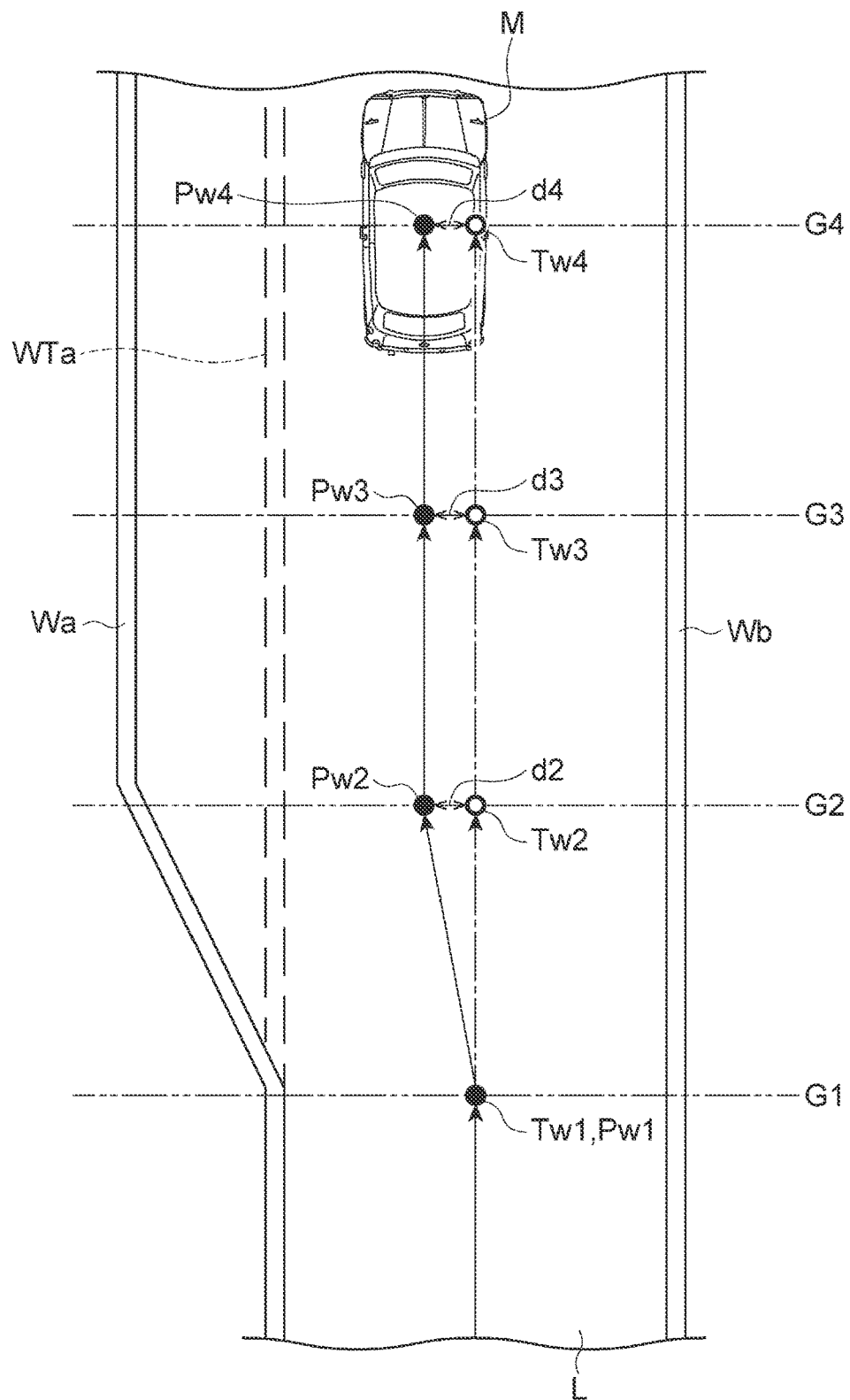
FIG. 3 is a plan view showing a situation in which there is a difference between the target lateral positions in a travel plan and the control-result lateral positions detected during autonomous driving control.

The calculation of the evaluation value of a travel plan is described below with reference to FIG. 3. FIG. 3 is a plan view showing a situation in which there is a difference between the target lateral positions in a travel plan and the control-result lateral positions detected during autonomous driving control. FIG. 3 shows a traveling lane L of the vehicle M, actual white lines Wa and Wb of the traveling lane L, and a white line WTa that was present in the past. FIG. 3 also shows set longitudinal positions G1-G4, target lateral positions Tw1-Tw4 in the travel plan, control-result lateral positions Pw1-Pw4, and differences d2-d4 between the target lateral positions Tw2-Tw4 and the control-result lateral positions Pw2-Pw4. The set longitudinal positions G1-G4 are set on the target route R in this order at a predetermined interval.

The target lateral position Tw1 shown in FIG. 3 is the target lateral position corresponding to the set longitudinal position G1. The target lateral position Tw2 is the target lateral position corresponding to the set longitudinal position G2. The target lateral position Tw3 is the target lateral position corresponding to the set longitudinal position G3. The target lateral position Tw4 is the target lateral position corresponding to the set longitudinal position G4. Similarly, the control-result lateral position Pw1 is the control-result lateral position corresponding to the set longitudinal position G1. The control-result lateral position Pw2 is the control-result lateral position corresponding to the set longitudinal position G2. The control-result lateral position Pw3 is the control-result lateral position corresponding to the set longitudinal position G3. The control-result lateral position Pw4 is the control-result lateral position corresponding to the set longitudinal position G4.

The difference d2 shown in FIG. 3 is the distance between the target lateral position Tw2 and the control-result lateral position Pw2 in the lane width direction. The difference d3 is the distance between the target lateral position Tw3 and the control-result lateral position Pw3 in the lane width direction. The difference d4 is the distance between the target lateral position Tw4 and the control-result lateral position Pw4 in the lane width direction. The difference between the target lateral position Tw1 in the travel plan and the control-result lateral position Pw1 is 0 because they are at the same position.

FIG. 3 shows that road construction was done to extend the lane width of the traveling lane L with the white line WTa replaced by a new white line Wa. Before the road construction, the white line WTa was a straight white line extending in parallel to the white line Wb. The new white line Wa is the same as the white line WTa up to the set longitudinal position G1. From that point on, the white line Wa is a white line that extends diagonally in such a way that the distance from the white line Wb increases as the vehicle travels from the set longitudinal position G1 to the set longitudinal position G2. From and beyond the set longitudinal position G2, the white line Wa is a straight white line that extends in parallel to the white line Wb. On the other hand, the map information is not yet updated in the map database and, therefore, the map database still stores the combination of two white lines, the white line WTa before the road construction and the white line Wb, as the white lines that form the traveling lane L.

The autonomous driving system 100 generates a travel plan so that the vehicle travels in the center of the traveling lane L according to the center position stored in the map information. Therefore, in FIG. 3, the target lateral positions Tw1-Tw4 in the travel plan are set, each at the position at an equal distance from the white line WTa and from the white line Wb in the lane width direction.

On the other hand, the autonomous driving system 100 performs autonomous driving control so that the vehicle M travels in the center of the actual traveling lane L, based on the actual road environment recognized by the images captured by the on-vehicle camera. Therefore, the control-result lateral positions Pw1-Pw4, detected during the autonomous driving control, are detected each as the position at an equal distance from the white line Wa and from the white line Wb in the lane width direction.

In the situation shown in FIG. 3, the autonomous driving system 100 calculates the evaluation value of the travel plan based on the result of comparison between the target lateral positions Tw1-Tw4 in the travel plan, generated based on the map information, and the control-result lateral positions Pw1-Pw4 detected during the autonomous driving control performed based on the actual road environment. Each time the control-result detection values corresponding to a predetermined number of set longitudinal positions are newly acquired, the autonomous driving system 100 calculates the evaluation value of the travel plan based on the result of comparison between the control target values and the control-result detection values associated with these set longitudinal positions. In the situation shown in FIG. 3, the autonomous driving system 100 calculates the evaluation value of the travel plan when the control-result lateral positions Pw1-Pw4 corresponding to the four set longitudinal positions G1-G4 are acquired, based on the result of comparison between the target lateral positions Tw1-Tw4 in the travel plan and the control-result lateral positions Pw1-Pw4.

The autonomous driving system 100 uses the differences d2-d4 as the result of comparison between the target lateral positions Tw1-Tw4 and the control-result lateral positions Pw1-Pw4. The larger the average value of the differences d2-d4 between the target lateral positions Tw1-Tw4 and the control-result lateral positions Pw1-Pw4 is, the smaller is the evaluation value of the travel plan calculated by the autonomous driving system 100. More specifically, the autonomous driving system 100 may calculate the reciprocal of the average value of the differences d2-d4 as the evaluation value of the travel plan.

The autonomous driving system 100 may use the median, sum, maximum value, or minimum value of the differences d2-d4 in place of the average value of the differences d2-d4. The autonomous driving system 100 may calculate the evaluation value of the travel plan using a predetermined calculation expression with the differences d2-d4 as its input.

The autonomous driving system 100 determines whether the interruption of autonomous driving control is required, based on the calculated evaluation value of the travel plan and an evaluation threshold. The evaluation threshold is a value that is set in advance. If the evaluation value of the travel plan is smaller than the evaluation threshold, the autonomous driving system 100 determines that the interruption of autonomous driving control is required because there is a possibility that the map information and the actual road environment are different to such an extent that the difference affects the autonomous driving control. If the evaluation value of the travel plan is not smaller than the evaluation threshold, the autonomous driving system 100 determines that the interruption of autonomous driving control is not required.

If it is determined that the interruption of autonomous driving control is required, the autonomous driving system 100 provides the interruption information on the autonomous driving control to the occupants of the vehicle M (for example, the driver) and to the other vehicles around the vehicle M. The interruption information on the autonomous driving control refers to the information used by the autonomous driving system 100 to inform that the autonomous driving control of the vehicle M will be interrupted. The interruption information on the autonomous driving control that is sent to the occupants of the vehicle M may include the information that requests the driver to start the manual driving of the vehicle M. The interruption information on the autonomous driving control that is sent to the other vehicles around the vehicle M may include the information about the traveling state of the vehicle M.

The autonomous driving system 100 provides the interruption information on the autonomous driving control to the occupants of the vehicle M via the display and the speaker in the vehicle interior. The autonomous driving system 100 may provide the interruption information on the autonomous driving control to the other vehicles around the vehicle M via vehicle-vehicle communication. The other vehicles around the vehicle M refer to the other vehicles positioned within a predetermined range from the vehicle M. The autonomous driving system 100 may provide the interruption information on the autonomous driving control only to one of the occupants of the vehicle M and the other vehicles around the vehicle M.

If it is determined that the interruption of autonomous driving control is required, the autonomous driving system 100 interrupts the autonomous driving control of the vehicle M. The interruption of autonomous driving control is to stop the autonomous driving control of the vehicle M along the target route R that has been performed by the autonomous driving system 100. The autonomous driving system 100 provides the interruption information on the autonomous driving control to the occupants of the vehicle M and the other vehicles around the vehicle and, after that, interrupts the autonomous driving control. The autonomous driving system 100 may provide the information and interrupt the autonomous driving control in parallel in time or may interrupt the autonomous driving control and, after that, provide the information.

<Configuration of autonomous driving system in this embodiment> As shown in FIG. 1, the autonomous driving system 100 in this embodiment includes an ECU 10 for performing autonomous driving control. The ECU 10 is an electronic control unit that includes a central processing unit (CPU), a read only memory (ROM), a random access memory (RAM), and a controller area network (CAN) communication circuit. The ECU 10 loads a program, stored in the ROM, into the RAM and executes the program loaded into the RAM for implementing various functions. The ECU 10 may be configured by a plurality of electronic control units. To the ECU 10, a GPS reception unit 1, an external sensor 2, an internal sensor 3, a map database 4, a navigation system 5, an actuator 6, a communication unit 7, and a human machine interface (HMI) 8 are connected via the CAN communication circuit.

The GPS reception unit 1, mounted on the vehicle M, functions as a position measurement unit that measures the position of the vehicle M. The GPS reception unit 1 receives signals from three or more GPS satellites to measure the position of the vehicle M (for example, the latitude and longitude of the vehicle M). The GPS reception unit 1 sends the information on the measured position of the vehicle M to the ECU 10.

The external sensor 2 is a detection apparatus for detecting an object, such as an obstacle, around the vehicle M. The external sensor 2 includes at least one of a camera, a radar, and a Laser Imaging Detection and Ranging (LIDAR). The external sensor 2 is used also for recognizing the white lines of a traveling lane, in which the vehicle M travels, as will be described later. The external sensor 2 may also be used for measuring the position of the vehicle M.

The camera is a capturing apparatus that captures the external situation of the vehicle. The camera is provided on the interior side of the windshield of the vehicle M and on the rear side of the vehicle. The camera may be provided under the right and left sides of the vehicle M. The camera sends captured information, generated by capturing the scene ahead of the vehicle M and the scene behind the vehicle M, to the ECU 10. The camera may be a monocular camera or a stereo camera. The stereo camera includes two capturing units arranged so that the disparity between the right eye and the left eye can be reproduced. The information captured by the stereo camera also includes the depth-direction information.

The radar detects an obstacle around the vehicle M using a radio wave (for example, millimeter wave). The radar detects an obstacle by sending a radio wave to the surroundings of the vehicle M and receiving a radio wave reflected by an obstacle. The radar sends the detected obstacle information to the ECU 10. In addition to the non-moving obstacles described above, the obstacles include moving obstacles such as bicycles and other vehicles.

The LIDAR detects an obstacle outside the vehicle M using light. The LIDAR measures the distance to a reflection point and detects an obstacle by sending light to the surroundings of the vehicle M and receiving light reflected by an obstacle. The LIDAR sends the detected obstacle information to the ECU 10. The LIDAR and the radar need not necessarily be installed in duplicate.

The internal sensor 3 is a detection apparatus that detects the traveling state of the vehicle M. The internal sensor 3 includes a vehicle speed sensor, an acceleration sensor, and a yaw rate sensor. The vehicle speed sensor is a detection apparatus that detects the speed of the vehicle M. An example of the vehicle speed sensor is a wheel speed sensor that is provided on the wheels of the vehicle M or on the drive shaft that rotates in synchronization with the wheels to detect the rotation speed of the wheels. The vehicle speed sensor sends the detected vehicle speed information to the ECU 10.

The acceleration sensor is a detection apparatus that detects the acceleration of the vehicle M. The acceleration sensor includes a longitudinal acceleration sensor that detects acceleration in the longitudinal direction of the vehicle M and a lateral acceleration sensor that detects the lateral acceleration of the vehicle M. The acceleration sensor sends the acceleration information on the vehicle M to the ECU 10. The yaw rate sensor is a detection apparatus that detects the yaw rate (turning angle velocity) around the vertical axis at the center of gravity of the vehicle M. A gyro sensor may be used as the yaw rate censor. The yaw rate sensor sends the detected yaw rate information on the vehicle M to the ECU 10.

The internal sensor 3 may include a steering angle sensor. The steering angle sensor is a sensor that detects the steering angle (actual steering angle) of the vehicle M. The steering sensor is provided on the steering shaft of the vehicle M. The steering angle sensor sends the detected steering angle information to the ECU 10.

The map database 4 is a database that stores map information. The map database 4 is formed in a hard disk drive (HDD) mounted on the vehicle M. The map database 4 is connected to the server of the map information management center over wireless communication via the communication unit 7. The map database 4 uses the latest map information, stored in the server of the map information management center, to regularly update the map information. The map database 4 need not always be mounted on the vehicle M. The map database 4 may be provided on a server capable of communicating with the vehicle M.

The navigation system 5, mounted on the vehicle M, sets the target route R on which the vehicle M will travel under autonomous driving control. The navigation system 5 calculates the target route R, from the position of the vehicle M to the destination E, based on the destination that is set in advance, the position of the vehicle M measured by the GPS reception unit 1, and the map information stored in the map database 4. The destination E of autonomous driving control is set when an occupant of the vehicle M performs an operation on the input button (or touch panel) provided on the navigation system 5. The target route R is set by identifying each of the lanes that form the road. The navigation system 5 may set the target route R using a known method. For use when the driver manually drives the vehicle M, the navigation system 5 may have the function to guide the driver along the target route R. The navigation system 5 sends the information on the target route R of the vehicle M to the ECU 10. The navigation system 5 may have a part of its function performed by the server of a facility, such as the information processing center, that is capable of communicating with the vehicle M. The function of the navigation system 5 may be performed by the ECU 10.

The target route R described in this specification includes a target route, which is generated automatically based on the past destination history and the map information when the destination is not explicitly set by the driver, such as a road-following route in the "driving assistance device" described in Japanese Patent No. 5382218 (WO2011/158347) or in the "autonomous driving device" described in Japanese Patent Application Publication No. 2011-162132 (JP 2011-162132 A).

The actuator 6 is a device that performs the traveling control of the vehicle M. The actuator 6 includes at least a throttle actuator, a brake actuator, and a steering actuator. The throttle actuator controls the amount of air to be supplied to the engine (throttle angle) according to the control signal from the ECU 10 to control the driving force of the vehicle M. When the vehicle M is a hybrid vehicle, the amount of air to be supplied to the engine, as well as the control signal from the ECU 10 to the motor that works as the source of power, is received to control the driving force. When the vehicle M is an electric vehicle, the control signal from the ECU 10 to the motor that works as the source of power is received to control the driving force. In this case, the motor that works as the source of power configures the actuator 6.

The brake actuator controls the brake system according to the control signal, received from the ECU 10, to control the braking force to be applied to the wheels of the vehicle M. As the brake system, a hydraulic brake system may be used. The steering actuator controls the driving of the assist motor, one component of the electric power steering system for controlling the steering torque, according to the control signal received from the ECU 10. By doing so, the steering actuator controls the steering torque of the vehicle M.

The communication unit 7 is mounted on the vehicle M to perform wireless communication. The communication unit 7 wirelessly communicates with servers such as the server in the map information management center that manages the map information. The communication unit 7 may perform vehicle-vehicle communication with other vehicles capable of vehicle-vehicle communication. The communication unit 7 may also perform road-vehicle communication with a roadside transmitter receiver installed along the road.

The HMI 8 is an interface for sending and receiving information between an occupant (for example, the driver) of the vehicle M and the autonomous driving system 100. The HMI 8 has a display for displaying image information to the occupants, a speaker for sending voices to the occupants, a vibration unit for sending vibrations to the occupants, and operation buttons or a touch panel for allowing the occupants to perform input operations. The vibration unit is a vibration actuator that sends vibrations for sending information to the driver. The vibration unit is provided, for example, in the seat cushion, in the seat back and/or in the headrest of the seat (for example, the driver's seat). The HMI 8 sends the information, entered by an occupant, to the ECU 10. In addition, the HMI 8 displays image information on the display or sends voices via the speaker in response to the control signal from the ECU 10.

Next, the functional configuration of the ECU 10 is described. The ECU 10 includes a vehicle position recognition unit 11, a road environment recognition unit 12, a traveling state recognition unit 13, a travel plan generation unit 14, a traveling control unit 15, a detection value acquisition unit 16, an evaluation value calculation unit 17, an interruption requirement determination unit 18, and an information providing unit 19. A part of the functions of the ECU 10 may be performed by a server capable of communicating with the vehicle M. At least one of the travel plan generation unit 14, detection value acquisition unit 16, evaluation value calculation unit 17, and interruption requirement determination unit 18 may be provided in a server capable of communicating with the vehicle M.

The vehicle position recognition unit 11 recognizes the position of the vehicle M on the map based on the position information received by the GPS reception unit 1 and the map information stored in the map database 4. The vehicle position recognition unit 11 recognizes the position of the vehicle M as a combination of the x-coordinate and the y-coordinate in the x-y orthogonal coordinate system in which the position of the vehicle M at the start time of autonomous driving control is the reference point. The vehicle position recognition unit 11 may recognize the position of the vehicle M through the SLAM technology, using the position information on the non-moving obstacles, such as a utility pole, included in the map information in the map database 4 and the detection result of the external sensor 2. In this case, instead of the GPS reception unit 1, the external sensor 2 functions as a position measurement unit.

The position of the vehicle M may be determined with the center position of the vehicle M, viewed from the vertical direction (planar view), as its reference point. The center position of the vehicle M is the center in the vehicle width direction of the vehicle M and is the center in the longitudinal direction of the vehicle M.

The vehicle position recognition unit 11 also recognizes the longitudinal position of the vehicle M and the lateral position of the vehicle M. When the position information on white lines is included in the map information, the vehicle position recognition unit 11 also recognizes the longitudinal position of the vehicle M and the lateral position of the vehicle M using the position of the vehicle in the x-y orthogonal coordinate system described above and the position information (coordinate information) on the white lines of the traveling lane in which the vehicle M travels. The vehicle position recognition unit 11 uses a known calculation processing method to calculate the longitudinal position of the vehicle M in the extending direction of the traveling lane and the lateral position of the vehicle M in the width direction of the traveling lane.

In addition, the vehicle position recognition unit 11 may use a known image processing method to recognize the lateral position of the vehicle M based on the captured image (image of white lines) ahead of the vehicle that is captured by the on-vehicle camera. The mounting position of the on-vehicle camera on the vehicle M is fixed, and the range captured by the camera mounted at this mounting position is also fixed. In addition, the positional relation (positional relation in planar view) between the camera mounting position and the center position of the vehicle M is fixed. Therefore, the vehicle position recognition unit 11 can calculate the center position of the vehicle M in the lane width direction (lateral position of the vehicle M) from the positions of the two white lines (right and left) included in the image captured by the camera. The vehicle position recognition unit 11 may recognize the lateral position of the vehicle M as the shift amount (deviation amount) of the center position of the vehicle M with respect to the center of the lane (the position at an equal distance from the two white lines (right and left)).

The vehicle position recognition unit 11 may recognize the lateral position of the vehicle M using the white lines detected, not by the camera, but by the LIDAR. The mounting position of the LIDAR on the vehicle M is fixed, and the range detected by the LIDAR mounted at this mounting position is also fixed. In addition, the positional relation (positional relation in planar view) between the LIDAR mounting position and the center position of the vehicle M is fixed. Therefore, the vehicle position recognition unit 11 can calculate the lateral position of the vehicle M from the positions of the two white lines (right and left) detected by the LIDAR.

The position of the vehicle M may be determined based, not on the center position of the vehicle M, but on the center of gravity position of the vehicle M when viewed from the vertical direction (center of gravity position of the vehicle M at design time). Because the positional relation between the center of gravity position of the vehicle M at design time and the center position of the vehicle M described above is fixed, the vehicle position recognition unit 11 can recognize the lateral position of the vehicle M with the center of gravity position of the vehicle M as the reference point in the same manner as when the center position of the vehicle M is used.

The road environment recognition unit 12 recognizes the road environment around the vehicle M based on the detection result of the external sensor 2. The road environment recognition unit 12 uses a known method to recognize the road environment around the vehicle M based on the image captured by the camera, the obstacle information detected by the LIDAR, or the obstacle information detected by the radar. More specifically, the road environment recognition unit 12 recognizes the positions of the white lines of the traveling lane, in which the vehicle M travels, based on the information captured by the camera and the obstacle information detected by the LIDAR. The road environment recognition unit 12 may further recognize the line type of the white lines and the curvature of the white lines. The road environment recognition unit 12 recognizes the non-moving obstacles around the vehicle M based on the information captured by the camera, the obstacle information detected by the LIDAR, or the obstacle information detected by the radar.

The traveling state recognition unit 13 recognizes the traveling state of the vehicle M, including the vehicle speed and the direction of the vehicle M, based on the detection result of the internal sensor 3. More specifically, the traveling state recognition unit 13 recognizes the vehicle speed of the vehicle M based on the vehicle speed information detected by the vehicle speed sensor. The traveling state recognition unit 13 recognizes the direction of the vehicle M based on the yaw rate information detected by the yaw rate sensor.

The travel plan generation unit 14 generates a travel plan of the vehicle M based on the target route R that is set by the navigation system 5 and the map information stored in the map database 4. At the same time the driver performs an operation to start autonomous driving control, the travel plan generation unit 14 starts the generation of a travel plan. This travel plan is a travel plan that is used when the vehicle M travels from the current position of the vehicle M to the destination that is set in advance. This travel plan is generated based on the map information.

More specifically, the travel plan generation unit 14 generates a travel plan by setting the set longitudinal positions on the target route R at a predetermined interval (for example, 1 m) and, at the same time, by setting the control target values (for example, target lateral position and the target vehicle speed) for each set longitudinal position. That is, the travel plan includes the control target values corresponding to each set longitudinal position on the target route R. The set longitudinal position and the target lateral position may be combined and set as one set of position coordinates. The set longitudinal position and the target lateral position mean the longitudinal position information and the lateral position information that are set as a target in the travel plan.

The generation of a travel plan is described more specifically with reference to FIG. 3. When the driver starts an operation to start autonomous driving control with the vehicle M positioned a predetermined distance (several hundred meters, several kilometers) before the set longitudinal position G1 shown in FIG. 3, the travel plan generation unit 14 generates a travel plan that includes the control target values corresponding to the set longitudinal positions G1-G4 based on the map information. The travel plan generation unit 14 generates a travel plan that causes the vehicle to travel in the center of the traveling lane L in the lane width direction. It should be noted here that, because the map information in the map database 4 is not updated, the travel plan generation unit 14 generates the travel plan based on the old map information (the map information that includes the white line WTa before the road construction and the white line Wb). That is, the travel plan generation unit 14 generates the travel plan that causes the vehicle M to travel along the target lateral positions Tw1-Tw4 each of which is at an equal distance from the white line WTa and the white line Wb.

In addition to the travel plan generated based on the map information, the travel plan generation unit 14 generates a short-term travel plan corresponding to the actual road environment. The short-term travel plan is generated as a plan that causes the vehicle M to travel in the detection range of the external sensor 2 (for example, the range within 150 m ahead of the vehicle M).

Like the travel plan, the short-term travel plan includes short-term control target values each corresponding to a set longitudinal position on the target route R. A short-term control target value refers to the value of the control target of the vehicle M in the short-term travel plan. The short-term control target value is set associated with each of the set longitudinal positions on the target route R. The short-term control target value includes the short-term target lateral position of the vehicle M and the short-term target vehicle speed of the vehicle M. The short-term target lateral position refers to the lateral position of the vehicle M that is a control target in the short-term travel plan. The short-term target vehicle speed refers to the vehicle speed of the vehicle M that is a control target in the short-term travel plan.

The travel plan generation unit 14 generates a short-term travel plan based on the road environment around the vehicle M recognized by the road environment recognition unit 12, the traveling state of the vehicle M recognized by the traveling state recognition unit 13, the position of the vehicle M recognized by the vehicle position recognition unit 11, and the travel plan (travel plan from the current position of the vehicle M to the destination).

If the map information includes no error, the travel plan generation unit 14 can use the control target values in the travel plan as the short-term control target values in the short-term travel plan. If the vehicle M is traveling at a lateral position different from the position defined in the travel plan (a lateral position that is not in the center of the lane), the travel plan generation unit 14 generates a short-term travel plan so that the vehicle M returns from the current position of the vehicle M to the center of the lane. Such a short-term travel plan can be generated by referring to Japanese Patent Application Publication No. 2009-291540 (JP 2009-291540 A).

The generation of a short-term travel plan is described more specifically with reference to FIG. 3. When the vehicle M travels to a point where the set longitudinal positions G1-G4 are included in the detection range of the external sensor 2, the travel plan generation unit 14 generates a short-term travel plan that includes the short-term control target values corresponding to the set longitudinal positions G1-G4. The travel plan generation unit 14 generates a short-term travel plan that causes the vehicle to travel in the center of the traveling lane L in the lane width direction. Based on the road environment amount the vehicle M, the travel plan generation unit 14 generates a short-term travel plan that causes the vehicle M to travel at a position at an equal distance from the actual white lines Wa and Wb. In this case, the short-term target lateral positions in the short-term travel plan corresponding to the set longitudinal positions G1-G4 are set respectively at the same positions as those of the control-result lateral positions Pw1-Pw4.

The traveling control unit 15 performs the autonomous driving control of the vehicle M based on a short-term travel plan generated by the travel plan generation unit 14. In other words, the traveling control unit 15 performs autonomous driving control based on a short-term travel plan generated from the road environment around the vehicle M, the traveling state of the vehicle M, the position of the vehicle M, and the travel plan.

The traveling control unit 15 calculates a command control value based on the short-term travel plan so that the lateral position and the vehicle speed of the vehicle M become equal to the target lateral position and the target vehicle speed in the short-term travel plan at a set longitudinal position. The traveling control unit 15 sends the calculated command control value to the actuator 6. The traveling control unit 15 controls the output of the actuator 6 (driving force, braking force, steering torque, etc.) using the command control value to perform the autonomous driving control of the vehicle M. The traveling control unit 15 performs autonomous driving control corresponding to the actual road environment based on the short-term travel plan. More specifically, the traveling control unit 15 performs autonomous driving control so that the vehicle M passes through the control-result lateral positions Pw1-Pw4 based on the short-term travel plan in the traveling lane L shown in FIG. 3.

If, as will be described, the interruption requirement determination unit 18 determines that the interruption of autonomous driving control is required, the traveling control unit 15 interrupts the autonomous driving control. The traveling control unit 15 stops the sending of a command control value to the actuator 6 to interrupt the autonomous driving control.

While the vehicle M performs autonomous driving control, the detection value acquisition unit 16 acquires the control-result detection values of the vehicle M detected during the autonomous driving control. The detection value acquisition unit 16 acquires the control-result detection values each associated with a set longitudinal position on the target route R. As described above, a control-result detection value includes the control-result vehicle speed and the control-result lateral position.

The detection value acquisition unit 16 calculates the vehicle speed of the vehicle M associated with a longitudinal position of the vehicle M, based on the longitudinal position of the vehicle M, recognized by the vehicle position recognition unit 11, and the vehicle speed information detected by the vehicle speed sensor. Based on the vehicle speed of the vehicle M associated with the longitudinal position of the vehicle M, the detection value acquisition unit 16 acquires the control-result vehicle speed of the vehicle M associated with each set longitudinal position. It should be noted that the control-result vehicle speed of the vehicle M, associated with a set longitudinal position, need not be the vehicle speed detected when the longitudinal position of the vehicle M coincides with the set longitudinal position. Instead, the detection value acquisition unit 16 may acquire the vehicle speed, which is one of the vehicle speeds of the vehicle M detected by the vehicle speed sensor at a regular interval and which is the vehicle speed detected when the longitudinal position of the vehicle M is nearest to the set longitudinal position, as the control-result vehicle speed of the vehicle M associated with the set longitudinal position.

Similarly, the detection value acquisition unit 16 acquires the control-result lateral position of the vehicle M, associated with each set longitudinal position, based on the longitudinal position of the vehicle M and the lateral position of the vehicle M recognized by the vehicle position recognition unit 11. It should be noted that the control-result lateral position of the vehicle M, associated with a set longitudinal position, need not be the lateral position of the vehicle M detected when the longitudinal position of the vehicle M coincides with the set longitudinal position. Instead, the detection value acquisition unit 16 may acquire the lateral position, which is one of the lateral positions of the vehicle M recognized by the vehicle position recognition unit 11 at a regular interval and which is the lateral position detected when the longitudinal position of the vehicle M is nearest to the set longitudinal position, as the control-result lateral position of the vehicle M associated with the set longitudinal position.

More specifically, in the traveling lane L shown in FIG. 3, the detection value acquisition unit 16 acquires the control-result lateral positions Pw1-Pw4, through which the vehicle M actually travelled, for the set longitudinal positions G1-G4, respectively. The control-result lateral positions Pw1-Pw4 are acquired as data that can be compared with the target lateral positions Tw1-Tw4 in the travel plan. The control-result lateral positions Pw1-Pw4, associated with the set longitudinal positions G1-G4, are acquired as the coordinate values in the x-y orthogonal coordinate system described above.

The evaluation value calculation unit 17 calculates the evaluation value of a travel plan. The evaluation value calculation unit 17 calculates the evaluation value of a travel plan based on the result of comparison between control target values in the travel plan, generated by the travel plan generation unit 14, and control-result detection values acquired by the detection value acquisition unit 16. The evaluation value calculation unit 17 compares the control target value and the control-result detection value associated with the same set longitudinal position. Each time the detection value acquisition unit 16 newly acquires the control-result detection values of a predetermined number of set longitudinal positions, the evaluation value calculation unit 17 calculates the evaluation value of the travel plan based on the result of comparison between the control target values and the control-result detection values associated with these set longitudinal positions. The predetermined number may be either one or two or more. The evaluation value calculation unit 17 compares the control target value and the control-result detection value for each set longitudinal position and, based on the result of this comparison, calculates the evaluation value of the travel plan.

The evaluation value calculation unit 17 may calculate the evaluation value of a travel plan once every predetermined time period (for example, 10 minutes). In this case, the evaluation value calculation unit 17 calculates the evaluation value of the travel plan from the result of comparison between the control target values and the control-result detection values using the control-result detection values acquired in the predetermined time period. In addition, the evaluation value calculation unit 17 recognizes the start time-of-day and/or the completion time-of-day of the calculation of the evaluation value of the travel plan based on the internal timer of the ECU 10.

As the comparison between the control target value and the control-result detection value, the evaluation value calculation unit 17 may compare the target vehicle speed and the control-result vehicle speed. If there is a stop line that is not included in the map information stored in the map database 4, the vehicle M that detects the stop line decelerates. Therefore, in this case, the target vehicle speed in the travel plan, which depends on the map information, becomes different from the control-result vehicle speed detected during the autonomous driving control according to the actual road environment. As the result of comparison between the target vehicle speed and the control-result vehicle speed, the evaluation value calculation unit 17 uses the difference between the target vehicle speed and the control-result vehicle speed. The evaluation value calculation unit 17 calculates the difference (absolute value) between the target vehicle speed and the control-result vehicle speed for each set longitudinal position. The larger the average value of the differences at the set longitudinal positions is, the smaller is the evaluation value of the travel plan calculated by the evaluation value calculation unit 17. The evaluation value calculation unit 17 may calculate the reciprocal of the average value of the differences at the set longitudinal positions as the evaluation value of the travel plan. In place of the average value of the differences, the evaluation value calculation unit 17 may use the median, sum, maximum value, or minimum value of the differences. In this way, the evaluation value calculation unit 17 calculates the evaluation value of the travel plan in terms of vehicle speed based on the result of comparison between the target vehicle speed and the control-result vehicle speed.

As the comparison between the control target value and the control-result detection value, the evaluation value calculation unit 17 may compare the target lateral position and the control-result lateral position. The comparison between the target lateral position and the control-result lateral position with reference to FIG. 3 was described before and, therefore, the description is omitted here. In this way, the evaluation value calculation unit 17 calculates the evaluation value of the travel plan in terms of lateral position based on the result of comparison between the target lateral position and the control-result lateral position.

After the evaluation value of a travel plan is calculated by the evaluation value calculation unit 17, the interruption requirement determination unit 18 sets an evaluation threshold. The evaluation threshold is a threshold used to determine whether the interruption of autonomous driving control is required. The interruption requirement determination unit 18 sets the evaluation threshold based on the position of the vehicle M on the map corresponding to the calculation time of the evaluation value of the travel plan performed by the evaluation value calculation unit 17. The calculation time of the evaluation value of the travel plan refers to the start time-of-day at which the evaluation value calculation unit 17 starts calculating the evaluation value of the travel plan. The calculation time of the evaluation value of the travel plan may be the completion time-of-day at which the evaluation value calculation unit 17 completes calculating the evaluation value of the travel plan. The position of the vehicle M on the map refers to the position of the vehicle M in the map information stored in the map database 4.

The interruption requirement determination unit 18 determines whether the position of the vehicle M on the map is located in an urban area or in a suburb. The map information includes data indicating whether a position is in an urban area or in a suburb. Because higher map information accuracy is required for autonomous driving control in an urban area than in a suburb, the interruption requirement determination unit 18 sets an evaluation threshold that is larger when the position is determined to be a position in an urban area than when the position is determined to be a position in a suburb. That is, the interruption requirement determination unit 18 sets the evaluation threshold in such a manner that autonomous driving control is interrupted more easily when the position is determined to be in an urban area than when the position is determined to be in a suburb.

In another method, the interruption requirement determination unit 18 may determine whether the vehicle M is positioned in an open road or in an expressway based on the position of the vehicle M on the map. The map information includes data indicating whether a road is an expressway. In the description below, a road that is not an expressway is an open road. Because higher map information accuracy is required for autonomous driving control in an open road than in an expressway, the interruption requirement determination unit 18 sets an evaluation threshold that is larger when the road is determined to be an open road than when the road is determined to be an expressway. That is, the interruption requirement determination unit 18 sets the evaluation threshold in such a manner that autonomous driving control is interrupted more easily when the road is determined to be in an open road than when the road is determined to be an expressway.

In still another method, the interruption requirement determination unit 18 may determine whether the vehicle M is positioned in a private road based on the position of the vehicle M on the map. In this case, the map information includes data indicating whether a road is a private road. Because higher map information accuracy is required for autonomous driving control in a private road where the road is narrower than an open road in many cases, the interruption requirement determination unit 18 sets an evaluation threshold that is larger when the road is determined to be a private road than when the road is determined to be an open road. That is, the interruption requirement determination unit 18 sets the evaluation threshold in such a manner that autonomous driving control is interrupted more easily when the road is determined to be a private road than when the road is determined to be an open road.

In addition, the interruption requirement determination unit 18 sets the evaluation threshold for the vehicle speed, and the evaluation threshold for the lateral position, respectively, based on the position of the vehicle M on the map.

The interruption requirement determination unit 18 determines whether the interruption of autonomous driving control is required based on the evaluation value of the travel plan and the evaluation threshold. When the evaluation value calculation unit 17 calculates the evaluation value of a travel plan, the interruption requirement determination unit 18 determines whether the interruption of autonomous driving control is required. If the evaluation value of the travel plan is smaller than the evaluation threshold, the interruption requirement determination unit 18 determines that the interruption of autonomous driving control is required. If the evaluation value of the travel plan is not smaller than the evaluation threshold, the interruption requirement determination unit 18 determines that the interruption of autonomous driving control is not required.

If, around the vehicle M, there is a dynamic obstacle that affects the autonomous driving control, the interruption requirement determination unit 18 need not determine whether the interruption of autonomous driving control is required because, in this case, it cannot be determined properly whether the interruption of autonomous driving control is required. Dynamic obstacles include bicycles, pedestrians, animals, and other vehicles. Based on the road environment around the vehicle M recognized by the road environment recognition unit 12, the interruption requirement determination unit 18 determines whether there is a dynamic obstacle within a predetermined distance (for example, within 1 m) from the target trajectory of the vehicle M in the travel plan (the trajectory that passes through the positions identified by the set longitudinal positions and the target lateral positions that area associated with each other). If it is determined that there is a dynamic obstacle within the predetermined distance from the target trajectory of the vehicle M, the interruption requirement determination unit 18 need not determine whether the interruption of autonomous driving control is required. The interruption requirement determination unit 18 may also be configured in such a way that there is no need to determine whether the interruption of autonomous driving control is required if it is determined that there is a dynamic obstacle ahead of the vehicle M.

If it is determined by the interruption requirement determination unit 18 that the interruption of autonomous driving control is required, the information providing unit 19 provides the interruption information on the autonomous driving control to the occupants (for example, the driver) of the vehicle M and to the other vehicles around the vehicle M. The information providing unit 19 sends the control signal to the HMI 8 to provide the information to the occupants of the vehicle M via the HMI 8. The information providing unit 19 provides the information to the occupants of the vehicle M by sending image information from the display of the HMI 8 or by sending voices from the speaker of the interruption requirement determination unit 18. In conjunction with sending image information from the display or sending voices from the speaker, the information providing unit 19 may cause the vibration unit under the seat to send vibrations. In addition, the information providing unit 19 provides the information to allow the driver to start manual driving.

The information providing unit 19 may provide the interruption information on autonomous driving control to the other vehicles around the vehicle M over vehicle-vehicle communication via the communication unit 7. In addition, the information providing unit 19 may provide the interruption information on the autonomous driving control, including the information on the traveling state of the vehicle M, to the other vehicles around the vehicle M. The information providing unit 19 may provide the interruption information on the autonomous driving control to the other vehicles around the vehicle M by projecting letters or images on the windshields (front windshield, side windshields, rear windshield) of the vehicle M. In this case, the vehicle M has a projector display for projecting letters and images on the windshields. The information providing unit 19 can use a known technology to perform the projection display described above. For the technology for projection display like this, see US Patent No. 2012/0089273.

The information providing unit 19 may provide the interruption information on the autonomous driving control only to one of the occupants of the vehicle M and the other vehicles around the vehicle M.

Figure 4A:
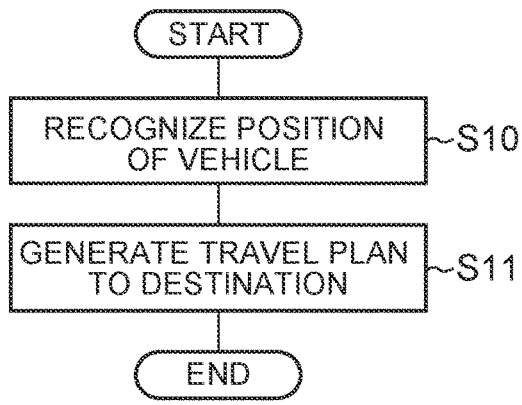
FIG. 4A is a flowchart showing the travel plan generation processing.
Figure 4B:
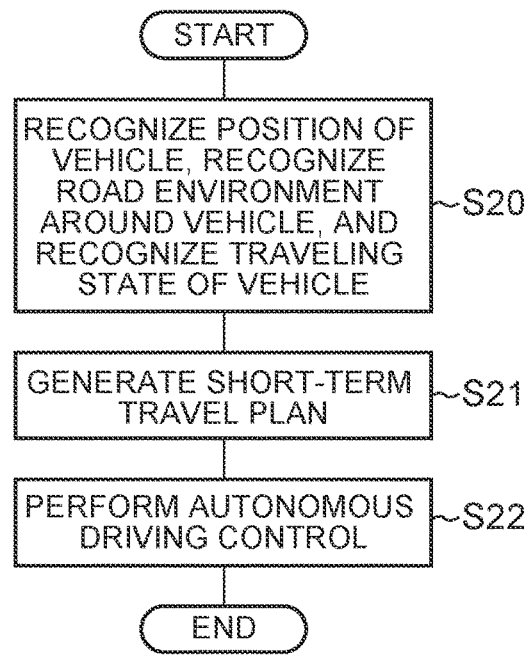
FIG. 4B is a flowchart showing autonomous driving control.

The travel plan generation processing of the autonomous driving system 100 in this embodiment is described below with reference to FIG. 4A. FIG. 4A is a flowchart showing the travel plan generation processing. The flowchart shown in FIG. 4A and FIG. 4B are performed when the driver performs an operation to start autonomous driving control.

In S10, the autonomous driving system 100 recognizes the position of the vehicle M via the vehicle position recognition unit 11 as shown in FIG. 4A. The vehicle position recognition unit 11 recognizes the position of the vehicle M on the map based on the position information received by the GPS reception unit 1 and the map information stored in the map database 4. The vehicle position recognition unit 11 may use the detection result of the external sensor 2 to recognize the position of the vehicle through the SLAM technology.

Next, in S11, the autonomous driving system 100 generates a travel plan via the travel plan generation unit 14. The travel plan generation unit 14 generates the travel plan, which causes the vehicle M to travel along the target route R, based on the position of the vehicle M that is recognized by the vehicle position recognition unit 11 and the target route R that is set by the navigation system 5 in advance. The travel plan generation unit 14 generates the travel plan from the current position of the vehicle M to the destination E, After the travel plan is generated based on the map information, the autonomous driving system 100 terminates the current travel plan generation processing. After that, when the driver changes the target route R, the autonomous driving system 100 starts the travel plan generation processing again.

Next, the autonomous driving control of the autonomous driving system 100 in this embodiment is described below with reference to FIG. 4B. FIG. 4B is a flowchart showing the autonomous driving control. The flowchart shown in FIG. 4B is performed when an operation to start autonomous driving control is performed by the driver and a travel plan is generated.

In S20, the autonomous driving system 100 recognizes the position of the vehicle M via the vehicle position recognition unit 11 as shown in FIG. 4B. The vehicle position recognition unit 11 recognizes the position of the vehicle M based on the position information received by the GPS reception unit 1 and the map information stored in the map database 4. The vehicle position recognition unit 11 may use the SLAM technology to recognize the position of the vehicle M. The vehicle position recognition unit 11 may estimate the position of the vehicle M from the history of change in the vehicle speed of the vehicle M and the history of change in the direction of the vehicle M, based on the vehicle speed information detected by the vehicle speed sensor and the yaw rate information detected by the yaw rate sensor.

In S20, the autonomous driving system 100 recognizes the road environment around the vehicle M via the road environment recognition unit 12. The road environment recognition unit 12 recognizes the positions of the white lines of the traveling lane and the road environment around the vehicle M based on the detection result of the external sensor 2. In addition, in S20, the autonomous driving system 100 recognizes the traveling state of the vehicle M via the traveling state recognition unit 13. The traveling state recognition unit 13 recognizes the vehicle speed of the vehicle M based on the vehicle speed information detected by the vehicle speed sensor and recognizes the direction of the vehicle M based on the yaw rate information detected by the yaw rate sensor.

Next, in S21, the autonomous driving system 100 generates a short-term travel plan via the travel plan generation unit 14. The travel plan generation unit 14 generates the short-term travel plan based on the position of the vehicle M, the road environment around the vehicle M, the traveling state of the vehicle M, and the travel plan. The travel plan generation unit 14 generates the short-term travel plan corresponding to the actual road environment. The travel plan generation unit 14 generates the short-term travel plan as a plan for causing the vehicle M to travel in the range detected by the external sensor 2.

Next, in S22, the autonomous driving system 100 performs the autonomous driving control of the vehicle M via the traveling control unit 15. The traveling control unit 15 performs autonomous driving control, which causes the vehicle M to travel according to the actual road environment, based on the short-term travel plan. The traveling control unit 15 performs the autonomous driving control of the vehicle M by controlling the output of the actuator 6 using a command control value.

After that, the autonomous driving system 100 repeats the processing beginning in S20 again while the vehicle M travels under control of autonomous driving control.

Figure 5:
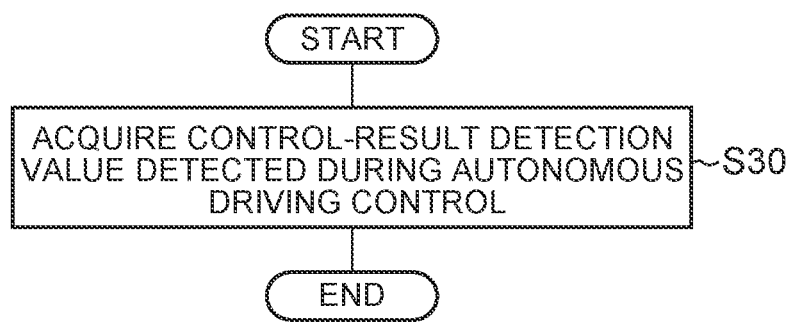
FIG. 5 is a flowchart showing the control-result detection value acquisition processing.

Next, the control-result detection value acquisition processing of the autonomous driving system 100 in this embodiment is described below. FIG. 5 is a flowchart showing the control-result detection value acquisition processing. The flowchart shown in FIG. 5 is performed when the vehicle M starts autonomous driving control.

In S30, the autonomous driving system 100 acquires a control-result detection value via the detection value acquisition unit 16 as shown in FIG. 5. The detection value acquisition unit 16 acquires the control-result detection value in association with a set longitudinal position on the target route R. The detection value acquisition unit 16 acquires the control-result vehicle speed of the vehicle M, associated with each set longitudinal position, based on the longitudinal position of the vehicle M recognized by the vehicle position recognition unit 11 and the vehicle speed information detected by the vehicle speed sensor. The detection value acquisition unit 16 acquires the control-result lateral position of the vehicle M, associated with each set longitudinal position, based on the longitudinal position of the vehicle M and the lateral position of the vehicle M recognized by the vehicle position recognition unit 11.

The detection value acquisition unit 16 acquires the control-result detection value when the longitudinal position of the vehicle M is at a set longitudinal position. The detection value acquisition unit 16 may also acquire the control-result detection values of a plurality of set longitudinal positions at the same time from the past data on the positions of the vehicle M (longitudinal position and lateral position) and the past data on the vehicle speed of the vehicle M (vehicle speed data associated with longitudinal positions).

Figure 6:
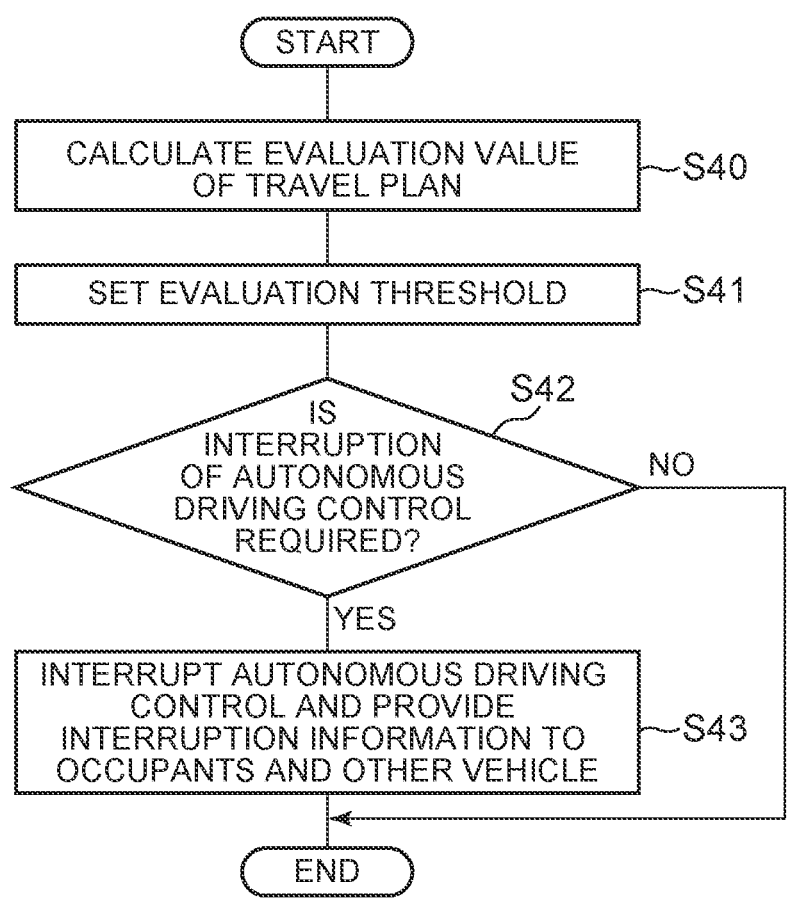
FIG. 6 is a flowchart showing the interruption requirement determination processing.

The interruption requirement determination processing of the autonomous driving system 100 in this embodiment is described below. FIG. 6 is a flowchart showing the interruption requirement determination processing. The flowchart shown in FIG. 6 is performed when a predetermined number of control-result detection values are newly acquired by the control-result detection value acquisition processing shown in FIG. 5.

In S40, the autonomous driving system 100 calculates the evaluation value of a travel plan via the evaluation value calculation unit 17 as shown in FIG. 6. The evaluation value calculation unit 17 calculates the evaluation value of the travel plan based on the result of comparison between a control target value in the travel plan, generated by the travel plan generation unit 14, and a control-result detection value acquired by the detection value acquisition unit 16. The evaluation value calculation unit 17 calculates the evaluation value of the travel plan based on the difference between the control target value and the control-result detection value at each set longitudinal position.

Next, in S41, the autonomous driving system 100 sets an evaluation threshold via the interruption requirement determination unit 18. The interruption requirement determination unit 18 sets the evaluation threshold based on the position of the vehicle M on the map corresponding to the time of calculation of the evaluation value of the travel plan performed by the evaluation value calculation unit 17.

Next, in S42, the autonomous driving system 100 determines, via the interruption requirement determination unit 18, whether it is required to interrupt the autonomous driving control. The interruption requirement determination unit 18 determines whether the interruption of autonomous driving control is required based on the evaluation value of the travel plan and the evaluation threshold. If it is determined that the interruption of autonomous driving control is not required, the autonomous driving system 100 terminates the current interruption requirement determination processing. Conversely, if it is determined that the interruption of autonomous driving control is required, the autonomous driving system 100 proceeds to S43.

In S43, the autonomous driving system 100 interrupts autonomous driving control via the traveling control unit 15 and provides the interruption information on the autonomous driving control via the information providing unit 19. The traveling control unit 15 stops the sending of a command control value to the actuator 6 to interrupt the autonomous driving control. The information providing unit 19 provides the interrupt information, which indicates that the autonomous driving control will be interrupted, to the occupants of the vehicle M and to the other vehicles around the vehicle M. The information providing unit 19 provides the information to the occupants of the vehicle M via the HMI 8. The information providing unit 19 provides the interruption information on the autonomous driving control to the other vehicles around the vehicle M over vehicle-vehicle communication via the communication unit 7. After that, the autonomous driving system 100 terminates the current interruption requirement determination processing.

The effect of the autonomous driving system in this embodiment is as follows. If there is a difference between the map information and the actual road environment, there is a difference between a control target value in the travel plan, which depends on the map information, and the corresponding control-result detection value detected during the autonomous driving control according to the actual road environment. In such a case, based on the evaluation value of the travel plan, calculated from the result of comparison between the control target value and the control-result detection value, and the evaluation threshold, the autonomous driving system 100 in this embodiment described above can determine whether the interruption of autonomous driving control is required. In addition, if it is determined that the interruption of the autonomous driving control is required, the autonomous driving system 100 provides the interruption information on the autonomous driving control to the occupants of the vehicle M and to the other vehicles around the vehicle M. Therefore, this autonomous driving system can provide the interruption information on the autonomous driving control, generated based on the map information, to the occupants of the vehicle M and to the other vehicles around the vehicle M. In addition, if an error is included in the map information but the error does not cause a large difference between a control target value in the travel plan and the control-result detection value detected during the autonomous driving control, the autonomous driving system 100 does not interrupt the autonomous driving control, thus avoiding an unnecessary interruption of the autonomous driving control.

In addition, the autonomous driving system 100 sets an evaluation threshold based on the position of the vehicle M on the map corresponding to the calculation time of the evaluation value of the travel plan. Therefore, because higher map information accuracy is required for autonomous driving control in an urban area than in a suburb, this autonomous driving system 100, which sets an evaluation threshold based on the position of the vehicle M on the map corresponding to the calculation time of the evaluation value of the travel plan, can accurately determine whether to interrupt the autonomous driving control according to the position of the vehicle M on the map.

While the embodiments of the present disclosure have been described above, it is to be understood that the present disclosure is not limited to the specific embodiments described above. The present disclosure can be implemented in a variety of modes in which various changes and modifications are added to the embodiments described above based on the knowledge of those skilled in the art.

A modification of a control target value and a control-result detection value is described below. A control target value in a travel plan need not always include both a target lateral position and a target vehicle speed. The travel plan generation unit 14 may generate a travel plan that includes only one of the control target lateral position and the target vehicle speed. In this case, the detection value acquisition unit 16 is required only to acquire the control-result detection value corresponding to one of the target lateral position and the target vehicle speed included in the travel plan.

In addition, the travel plan generation unit 14 may use the target steering angle of the vehicle M instead of the target lateral position of the vehicle M. The target steering angle refers to the target value of the steering angle of the vehicle M that is used in autonomous driving control. Instead of the steering angle, the steering torque, yaw angle, or yaw rate may also be used. The travel plan generation unit 14 may use the target acceleration of the vehicle M instead of the target vehicle speed of the vehicle M. The target acceleration refers to the target value of the acceleration of the vehicle M that is used in autonomous driving control.

In this case, the detection value acquisition unit 16 acquires the control-result steering angle as the control-result detection value corresponding to the target steering angle. The control-result steering angle is the steering angle of the vehicle M under autonomous driving control detected at a set longitudinal position. The control-result steering angle is detected by the steering angle sensor of the vehicle M. In addition, the detection value acquisition unit 16 acquires the control-result acceleration as the control-result detection value corresponding to the target acceleration. The control-result acceleration is the acceleration (deceleration) of the vehicle M under autonomous driving control detected at a set longitudinal position. The control-result acceleration is detected by the acceleration sensor of the vehicle M.

A modification of the result of comparison between a control target value and a control-result detection value is described below. The evaluation value calculation unit 17 need not necessarily use the difference between a control target value and the corresponding control-result detection value as the result of comparison between the control target value in a travel plan and the control-result detection value detected during the autonomous driving control. As the result of comparison between a control target value in a travel plan and the corresponding control-result detection value detected during the autonomous driving control, the evaluation value calculation unit 17 may use the ratio between the control target value and the control-result detection value. Using the ratio between the control target value and the control-result detection value in this manner makes the result of comparison a dimensionless amount. In this case, the ratio between the control target value and the control-result detection value, if used as the evaluation value of the travel plan, makes the evaluation value a dimensionless amount. That is, for the vehicle speed and the lateral position each measured in its own unit, the dimensionless-amount evaluation value can be calculated respectively. This makes the evaluation threshold, used by the interruption requirement determination unit 18, a dimensionless amount and, therefore, eliminates the need for separately setting the evaluation threshold for the vehicle speed (unit: km/h) and the evaluation threshold for the lateral position (unit: m), allowing the same evaluation threshold to be used.

A modification of the generation of a travel plan is described below. The map information may include the information on a lane centerline that is a virtual line formed by joining the center positions each at an equal distance from the right white line and the left white line of the lane in the lane width direction. In this case, based on the information on the lane centerline included in the map information, the travel plan generation unit 14 can generate a travel plan that causes the vehicle M to travel along the centerline. The information on the virtual lane centerline, if prepared in advance in this manner, eliminates the need for the travel plan generation unit 14 to calculate the lane center position from the position information on the white lines or the curbs stored in the map information, thus lightening the calculation load. The map information may include the information on the past traveling trajectories of the vehicle M. In this case, the travel plan generation unit 14 can generate a travel plan based on the information on the past traveling trajectories of the vehicle M included in the map information.

A modification of the setting of an evaluation threshold is described below. The interruption requirement determination unit 18 may set an evaluation threshold based, not on the position of the vehicle M on the map corresponding to the calculation time of the evaluation value of a travel plan, but on the calculation time-of-day of the evaluation value of the travel plan. The calculation time-of-day of the evaluation of a travel plan refers to the time-of-day at which the evaluation value calculation unit 17 starts calculating the evaluation value of the travel plan. The calculation time-of-day of the evaluation value of a travel plan may also be the time-of-day at which the evaluation value calculation unit 17 completes calculating the evaluation value of the travel plan.

To set an evaluation threshold based on the calculation time-of-day of the evaluation value of a travel plan, the interruption requirement determination unit 18 determines whether the calculation time-of-day of the evaluation value of the travel plan is a time in the night or the day. Because accuracy in recognizing an object, such as a white line, in a camera-captured image in the night is lower than that in the day, there is a possibility that the reliability in determining whether the interruption of autonomous driving control is required is decreased in the night. Therefore, when the calculation time-of-day is determined to be a time in the night, the interruption requirement determination unit 18 sets the evaluation threshold smaller than the evaluation threshold that is set when the calculation time is determined to be a time in the day. That is, the interruption requirement determination unit 18 sets the evaluation threshold in such a manner that it is more difficult to determine that the interruption of autonomous driving control is required when the calculation time is determined to be a time in the night than it is when the calculation time is determined to be a time in the day.

In addition, the interruption requirement determination unit 18 may determine whether the calculation time-of-day of the evaluation value of a travel plan is the sunset time. There is a possibility that accuracy in recognizing an object, such as a white line, at the sunset time is decreased due to the sunset. Therefore, when the calculation time-of-day is determined to be the sunset time, the interruption requirement determination unit 18 may set the evaluation threshold smaller than the evaluation threshold that is set when the calculation time-of-day is determined to be a time in the night. That is, the interruption requirement determination unit 18 sets the evaluation threshold in such a manner that it is more difficult to determine that the interruption of autonomous driving control is required when the calculation time-of-day is determined to be the sunset time than it is when the calculation time-of-day is determined to be a time in the night.

Accuracy in recognizing an object, such as a white line, in a camera-captured image in the night is decreased as compared to that in the day with the result that this decrease in accuracy affects the reliability in determining whether the interruption of autonomous driving control is required. Therefore, the autonomous driving system 100 in this modification sets an evaluation threshold based on the calculation time-of-day of the evaluation value of a travel plan, thus making it possible to determine correctly whether the interruption of autonomous driving control is required according to the calculation time-of-day.

When the vehicle M is designed to place priority on the detection result of the radar sensor rather than on the image captured by the camera, there is a possibility that the detection accuracy of the radar sensor is decreased by the sunlight in the day. Therefore, when the calculation time-of-day of the evaluation value of a travel plan is determined to be a time in the day, the interruption requirement determination unit 18 may set the evaluation threshold smaller than the evaluation threshold that is set when the calculation time-of-day of the evaluation value of the travel plan is determined to be a time in the night. In addition, the interruption requirement determination unit 18 may set the evaluation threshold based on both the position of the vehicle M on the map corresponding to the calculation time of the evaluation value of a travel plan and the calculation time-of-day of the evaluation value of the travel plan. In addition, the interruption requirement determination unit 18 need not necessarily set the evaluation threshold based on the position of the vehicle M on the map or the calculation time-of-day but may use a fixed-value evaluation threshold that is set in advance.

A modification of the calculation of the evaluation value of a travel plan and the determination of interruption requirement is described below. The evaluation value calculation unit 17 need not necessarily calculate the evaluation value as a larger value as the degree of equality between the control target values in the travel plan and the control-result detection values detected during the autonomous driving control is higher but may calculate the evaluation value as a smaller value as the degree of equality between the control target values and the control-result detection values is higher. In this case, the interruption requirement determination unit 18 determines that the interruption of autonomous driving control is required if the evaluation value of the travel plan is equal to or larger than the evaluation threshold. The interruption requirement determination unit 18 determines that the interruption of autonomous driving control is not required if the evaluation value of the travel plan is smaller than the evaluation threshold.

In addition, the evaluation value calculation unit 17 in this embodiment may put a weight (multiplication by a predetermined weighting coefficient) on both or one of the evaluation value of a travel plan for the vehicle speed and the evaluation value of the travel plan for the lateral position and then calculate the sum as the evaluation value of the travel plan. The evaluation value calculation unit 17 may normalize (division by a predetermined normalization coefficient) both or one of the evaluation value of a travel plan for the vehicle speed and the evaluation value of the travel plan for the lateral position and then calculate the sum as the evaluation value of the travel plan.

A modification of autonomous driving control is described below. The autonomous driving control according to the present disclosure need not necessarily perform control for both the vehicle speed and the lateral position of the vehicle M based on a travel plan. The autonomous driving control may be control performed by a combination of the adaptive cruise control (ACC) and the autonomous lateral position adjustment of the vehicle M based on the travel plan. The control content of ACC is described in the embodiments above and therefore the description is omitted here. When ACC is used, a travel plan (travel plan that depends on the map information) for the vehicle speed (or acceleration) of the vehicle M is not generated. Autonomous lateral position adjustment refers to the control for adjusting the lateral position of the vehicle M based on the travel plan (travel plan that depends on the map information) including the lateral position (target lateral position) of the vehicle M that is set for each set longitudinal position on the target route R. In this case, the autonomous driving system 100 determines whether the interruption of autonomous driving control is required based on the result of comparison between the target lateral position in the travel plan and the control-result lateral position of the control detection result.

The autonomous driving control may be control performed by a combination of the steering assistance that depends on the sensor result and the autonomous vehicle speed adjustment of the vehicle M based on a travel plan. The control content of the steering assistance is described in the embodiments above and therefore the description is omitted here. When the steering assistance is used, a travel plan (travel plan that depends on the map information) for the lateral position (or steering angle) of the vehicle M is not generated. Autonomous lateral position adjustment refers to the control for adjusting the vehicle speed of the vehicle M based on a travel that includes the vehicle speed (target vehicle speed) of the vehicle M that is set for each set longitudinal position on the target route R. In this case, the autonomous driving system 100 determines whether the interruption of autonomous driving control is required based on the result of comparison between the target vehicle speed in the travel plan and the control-result vehicle speed of the control detection result.

A reference example in which a short-term control target value in a short-term travel plan is used is described below. The autonomous driving system 100 may calculate the evaluation value of a travel plan using a short-term control target value in a short-term travel plan in place of a control-result detection value detected during the autonomous driving control. In this case, the evaluation value calculation unit 17 calculates the evaluation value of the travel plan based on the result of comparison between the control target value in the travel plan that depends on the map information and the short-term control target value in the short-term travel plan corresponding to the actual road environment. The evaluation value calculation unit 17 generates a larger evaluation value of the travel plan as the degree of equality between the control target values in the travel plan and the short-term control target values in the short-term travel plan is higher. The result of comparison between the control target value in the travel plan and the short-term control target value in the short-term travel plan may be the difference between the control target value in the travel plan and the short-term control target value in the short-term travel plan or may be the ratio between the control target values in the travel plan and the short-term control target value in the short-term travel plan.

If there is a difference between a road in the map information and an actual road environment, a difference is generated between a control target value in the travel plan that depends on the map information and the corresponding short-term control target value in the short-term travel plan generated according to the actual road environment. Therefore, the autonomous driving system 100 can use the evaluation value of the travel plan, calculated from the result of comparison between the control target value and the short-term control target value, to determine whether the interruption of autonomous driving control is required.

Because the short-term control target value associated with a set longitudinal position can be acquired even if the vehicle M has not yet arrived at the set longitudinal position, the autonomous driving system 100 in the reference example can calculate the evaluation value of the travel plan earlier than when the control-result detection value detected during the autonomous driving control is used, making it possible to determine earlier whether the interruption of autonomous driving control is required.

What is claimed is:

1. A vehicle including an autonomous driving system that performs autonomous driving control of the vehicle, the vehicle comprising:
    a position sensor configured to detect a position of the vehicle;
    an external sensor configured to detect objects external to the vehicle;
    an internal sensor configured to detect a traveling state of the vehicle;
    a map database that stores map information; and
    at least one electronic control unit including:
        a travel plan generation unit configured to generate a travel plan of the vehicle based on a target route of the vehicle and the map information, the travel plan including a control target value of the vehicle corresponding to a position on the target route, the target route being set in advance;
        a vehicle position recognition unit configured to recognize the position of the vehicle based on a measurement result of the position sensor or the external sensor;
        a road environment recognition unit configured to recognize a road environment around the vehicle based on a detection result of the external sensor;
        a traveling state recognition unit configured to recognize the traveling state of the vehicle based on a detection result of the internal sensor;
        a traveling control unit configured to perform the autonomous driving control of the vehicle based on the travel plan, the position of the vehicle, the road environment around the vehicle, and the traveling state of the vehicle;
        a detection value acquisition unit configured to acquire a control-result detection value in association with the position on the target route, the control-result detection value being detected during the autonomous driving control of the vehicle;
        an evaluation value calculation unit configured to calculate an evaluation value of the travel plan based on a result of comparison between the control target value and the control-result detection value;
        an interruption requirement determination unit configured to determine whether an interruption of the autonomous driving control is required based on the evaluation value of the travel plan and an evaluation threshold; and
    a human-machine interface configured to provide interruption information on the autonomous driving control to an occupant of the vehicle if the interruption requirement determination unit determines that the interruption of the autonomous driving control is required; and
    a communication unit configured to provide the interruption information to other vehicles around the vehicle if the interruption requirement determination unit determines that the interruption of the autonomous driving control is required.

2. The vehicle according to claim 1, wherein the interruption requirement determination unit sets the evaluation threshold based on a position of the vehicle on a map corresponding to a calculation time of the evaluation value of the travel plan or based on a calculation time-of-day of the evaluation value of the travel plan.

3. The vehicle according to claim 2, wherein the vehicle position recognition unit recognizes the position of the vehicle on the map based on position information measured by the position sensor and the map information stored in the map database.

4. The vehicle according to claim 1, wherein the position sensor of the vehicle is a GPS reception unit and the vehicle position recognition unit recognizes the position of the vehicle based on position information received by the GPS reception unit.

5. The vehicle according to claim 1, wherein, if position information on white lines is included in the map information, the vehicle position recognition unit uses a position of the vehicle in an x-y orthogonal coordinate system and position information of actual white lines on a traveling lane, in which the vehicle travels, to calculate a longitudinal position of the vehicle in an extending direction of the traveling lane and a lateral position of the vehicle in a width direction of the traveling lane.

6. The vehicle according to claim 1, wherein,
the travel plan generation unit is configured to generate the travel plan such that the travel plan includes a plurality of control target values,
the detection value acquisition unit is configured to acquire a plurality of control-result detection values, and
each time the detection value acquisition unit newly acquires the control-result detection values of a predetermined number of set longitudinal positions, the evaluation value calculation unit calculates the evaluation value of the travel plan based on a result of comparison between the control target values associated with the set longitudinal positions and the control-result detection values.

7. The vehicle according to claim 5, wherein the road environment recognition unit recognizes positions of the actual white lines on the traveling lane and the road environment around the vehicle based on the detection result of the external sensor.

8. The vehicle according to claim 1, wherein the traveling state recognition unit recognizes a vehicle speed of the vehicle based on vehicle speed information detected by a vehicle speed sensor included in the internal sensor and, at a same time, recognizes a direction of the vehicle based on yaw rate information detected by a yaw rate sensor included in the internal sensor.

9. The vehicle according to claim 1, wherein the travel plan generation unit generates a short-term travel plan based on the position of the vehicle, the road environment around the vehicle, the traveling state of the vehicle, and the travel plan.

10. The vehicle according to claim 9, wherein the control-result detection value is a short-term control target value in the short-term travel plan and the evaluation value calculation unit calculates the evaluation value of the travel plan based on a result of comparison between the control target value and the short-term control target value.

11. The vehicle according to claim 1, wherein the at least one electronic control unit comprises a plurality of electronic control units.

12. A vehicle including an autonomous driving system that performs autonomous driving control of the vehicle, the vehicle comprising:
a position sensor configured to detect a position of the vehicle;
an external sensor configured to detect objects external to the vehicle;
an internal sensor configured to detect a traveling state of the vehicle;
a map database that stores map information; and
at least one processor configured to:
generate a travel plan of the vehicle based on a target route of the vehicle and the map information, the travel plan including a control target value of the vehicle corresponding to a position on the target route, the target route being set in advance;
recognize the position of the vehicle based on a measurement result of the position sensor or the external sensor;
recognize a road environment around the vehicle based on a detection result of the external sensor;
recognize the traveling state of the vehicle based on a detection result of the internal sensor;
perform the autonomous driving control of the vehicle based on the travel plan, the position of the vehicle, the road environment around the vehicle, and the traveling state of the vehicle;
acquire a control-result detection value in association with the position on the target route, the control-result detection value being detected during the autonomous driving control of the vehicle;
calculate an evaluation value of the travel plan based on a result of comparison between the control target value and the control-result detection value;
determine whether an interruption of the autonomous driving control is required based on the evaluation value of the travel plan and an evaluation threshold; and
a human-machine interface configured to provide interruption information on the autonomous driving control to an occupant of the vehicle.

13. The vehicle according to claim 12, wherein the at least one processor sets the evaluation threshold based on a position of the vehicle on a map corresponding to a calculation time of the evaluation value of the travel plan or based on a calculation time-of-day of the evaluation value of the travel plan.

14. The vehicle according to claim 13, wherein the at least one processor recognizes the position of the vehicle on the map based on position information measured by the position sensor and the map information stored in the map database.

15. The vehicle according to claim 14, wherein the position sensor of the vehicle is a GPS reception unit and the at least one processor recognizes the position of the vehicle based on position information received by the GPS reception unit.

16. The vehicle according to claim 12, wherein, if position information on white lines is included in the map information, the at least one processor uses a position of the vehicle in an x-y orthogonal coordinate system and position information of actual white lines on a traveling lane, in which the vehicle travels, to calculate a longitudinal position of the vehicle in an extending direction of the traveling lane and a lateral position of the vehicle in a width direction of the traveling lane.

17. The vehicle according to claim 16, wherein the at least one processor recognizes positions of the actual white lines on the traveling lane and the road environment around the vehicle based on the detection result of the external sensor.

18. The vehicle according to claim 12, wherein,
the at least one processor is configured to generate the travel plan such that the travel plan includes a plurality of control target values,
the at least one processor is configured to acquire a plurality of control-result detection values, and
each time the at least one processor newly acquires the control-result detection values of a predetermined number of set longitudinal positions, the at least one processor calculates the evaluation value of the travel plan based on a result of comparison between the control target values associated with the set longitudinal positions and the control-result detection values.

19. The vehicle according to claim 12, wherein the at least one processor recognizes a vehicle speed of the vehicle based on vehicle speed information detected by a vehicle speed sensor included in the internal sensor and, at a same time, recognizes a direction of the vehicle based on yaw rate information detected by a yaw rate sensor included in the internal sensor.

20. The vehicle according to claim 12, wherein the at least one processor generates a short-term travel plan based on the position of the vehicle, the road environment around the vehicle, the traveling state of the vehicle, and the travel plan.

21. The vehicle according to claim 20, wherein the control-result detection value is a short-term control target value in the short-term travel plan and the at least one processor calculates the evaluation value of the travel plan based on a result of comparison between the control target value and the short-term control target value.

22. The vehicle according to claim 12, wherein the at least one processor comprises a plurality of processors.

* * * * *